(12) United States Patent
Campagna et al.

(10) Patent No.: US 6,508,918 B2
(45) Date of Patent: *Jan. 21, 2003

(54) FUEL AND PROCESS FOR FUEL PRODUCTION

(75) Inventors: Marc Jean Campagna, Katevale (CA); Richard Herbert Colt, Ayer's Cliff (CA)

(73) Assignee: Terralogix Inc., Stanstead (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/725,202

(22) Filed: Nov. 29, 2000

(65) Prior Publication Data

US 2001/0006146 A1 Jul. 5, 2001

Related U.S. Application Data (63) Continuation of application No. 09/417,049, filed on Oct. 13, 1999, now Pat. No. 6,193,851, which is a continuation of application No. PCT/CA98/00367, filed on Apr. 16, 1998.
(60) Provisional application No. 60/044,062, filed on Apr. 17, 1997, and provisional application No. 60/057,491, filed on Sep. 4, 1997.

(51) Int. Cl.$^7$ ............................................. B01J 19/08
(52) U.S. Cl. ...................................... 204/164; 123/538
(58) Field of Search .......................... 204/164; 123/538

(56) References Cited

U.S. PATENT DOCUMENTS

| 3,976,726 | A | | 8/1976 | Johnson |
| 4,865,003 | A | | 9/1989 | Schamweber et al. |
| 4,869,795 | A | | 9/1989 | Taoda et al. |
| 5,922,397 | A | | 7/1999 | Hideaki et al. |
| 6,193,851 | B1 | * | 2/2001 | Campagna .................. 204/164 |

FOREIGN PATENT DOCUMENTS

| BE | 841 622 | 11/1976 |
| DE | 24 13 558 | 10/1974 |
| DE | 40 28 228 | 3/1992 |
| DE | 43 29 329 | 3/1995 |
| EP | 01 33 854 | 3/1985 |

* cited by examiner

Primary Examiner—Kishor Mayekar

(57) ABSTRACT

A highly combustible fuel which exhibits low exhaust pollutants is developed by exposing an atmosphere of a gaseous hydrocarbon fuel, for example, gasoline, to a source of energy such as an electrical potential difference, ultraviolet radiation, microwave radiation or laser radiation. The combustible fuel can be fed directly to the cylinders of an internal combustion engine. It is clearly visible in the flask as being whitish silvery grey in color. The combustible fuel can also be condensed and the condensate employed as a fuel.

10 Claims, 8 Drawing Sheets

FUEL AND PROCESS FOR FUEL PRODUCTION

CROSS REFERENCE TO RELATED APPLICATIONS

This application is a continuation of U.S. application Ser. No. 09/417,049, filed Oct. 13, 1999, now U.S. Pat. No. 6,193,851, which is a continuation of PCT/CA98/00367 filed Apr. 16, 1998, in which the United States of America was designated and elected, and which remained pending in the International Phase until Oct. 17, 1999, which application in turn claims priority from U.S. applications Ser. No. 60/044,062 filed Apr. 17, 1997, and Ser. No. 60/057,491 filed Sep. 4, 1997, and the benefit of 35 U.S.C. 119(e).

TECHNICAL FIELD

This invention relates to a highly combustible fuel and a process for producing such fuel; more especially the invention concerns such a fuel for motor driven vehicles such as automobiles, trucks and boats which traditionally employ gasoline as fuel, as well as aircraft fuel and furnace applications, and which fuel exhibits low exhaust pollutant levels and high efficiency.

BACKGROUND ART

Motor driven vehicles such as automobiles and aircraft are fueled by a mixture of gasoline and air. Automobiles employ a carburetor or a fuel injection which produces an explosive mixture of gasoline and air by spraying the gasoline into air. The mixture may be swirled through an intake manifold and delivered to the engine cylinders of an internal combustion engine; or the gasoline may be injected or inducted directly into the cylinders and the air may be delivered separately through the intake manifold. Whichever way the mixture is formed it is crude and unstable and if not combusted immediately droplets of liquid gasoline fall from the mixture.

Aromatic hydrocarbons are included in gasoline to slow the combustion process and reduce knocking in the cylinders.

Such mixtures also result in significant levels of pollutants when combusted.

DISCLOSURE OF THE INVENTION

This invention seeks to provide a highly combustible fuel for motor driven vehicles, more efficient and exhibiting lower levels of exhaust pollutants than conventional mixtures of gasoline and air.

In accordance with one aspect of the invention there is provided a process of producing a combustible fuel comprising exposing a gaseous hydrocarbon fuel to an electrical field or plasma or to ultraviolet radiation, microwave radiation or laser to produce a fuel of improved combustibility as compared with said hydrocarbon fuel.

More especially the exposure is at an elevated temperature and charged particles are derived from the gaseous hydrocarbon fuel, the charged particles being fed to the engine cylinder. The charged particles may bear a negative charge or a positive charge but negatively charged particles are preferred.

In accordance with another aspect of the invention there is provided a combustible fuel produced by the aforementioned process of the invention.

In accordance with a specific embodiment of the invention there is provided a process of producing a combustible fuel comprising: a) introducing a gaseous, oxygeneous fluid into an atmosphere of gaseous hydrocarbon fuel maintained under vacuum, and b) establishing an electrical potential difference across said atmosphere or irradiating said atmosphere with ultraviolet radiation, microwave radiation or laser to produce a combustible fuel of said oxygeneous fluid bound to said gaseous hydrocarbon fuel.

In accordance with another embodiment of the invention there is provided a combustible fuel which is a homogeneous composition produced by a) introducing a gaseous, oxygeneous fluid into an atmosphere of gaseous hydrocarbon fuel maintained under vacuum, and b) establishing an electrical ionization potential difference across said atmosphere or irradiating said atmosphere with ultraviolet radiation, microwave radiation or laser to produce a combustible fuel of said oxygeneous fluid bound to said gaseous hydrocarbon fuel.

DESCRIPTION OF PREFERRED EMBODIMENTS i) General Process

In the process of the invention a gaseous hydrocarbon fuel is exposed to an electrical field or plasma, more especially an electrical ionization potential difference, or to ultraviolet radiation, microwave radiation or laser.

The exposure may be carried out in the presence of a gaseous carrier fluid, for example, an oxygeneous fluid such as oxygen and/or air, or a mixture of oxygen and/or air and steam or gaseous water vapor. Other gaseous carrier fluids include nitrogen and the inert gases, for example, argon and helium.

While not wishing to be bound by any particular theory as to the mechanism of combustible fuel production, it is postulated in one theory that the electrical ionization potential difference, or the radiation activates the gaseous hydrocarbon fuel to a high energy state, more especially the hydrocarbon molecules or ions of the fuel are thought to be electronically excited to a state in which they are more reactive or more susceptible to combustion than the hydrocarbon fuel in the non-excited state.

Another theory is that the process generates an extremely finely divided aerosol having a particle size far smaller than that achieved with a normal carburetor or fuel injector equipped system. Under the conditions of formation, the droplet particles are initially formed in a strongly electrically-charged condition. This is a metastable condition, leading immediately to the disruption of the highly charged droplets by internal coulombic repulsion and the formation of much more finely divided droplets each of which carries a portion of the charge initially held by the original droplet. These second generation droplets may then rapidly and similarly undergo further disruption and dispersion and so on until the fuel-air mixture enters the combustion chambers and is ignited. Mutual electrostatic repulsion between these fuel particles prevents them from coalescing back to larger droplets. Furthermore, the droplets enter the combustion chambers relatively more finely divided than in a normal carburetor or fuel injector equipped system. Since burning of the fuel in the combustion chambers occurs at the fuel particle surface, its rate is therefore dependent upon the surface area. Burning at high engine speeds is incomplete before normally-sized droplets in the normal carburetor or fuel injector equipped systems are ejected as exhaust, and therefore completeness of combustion is compromised if the droplet size is large. On the other hand, an extremely finely divided dispersion provides a huge increase in the surface area for burning and leads to much more complete combustion with the resulting decrease in carbon monoxide and unburnt hydrocarbon emissions which are observed with this invention.

A reactor employed in the invention was modified to incorporate a very fine mesh screen in the out flow stream of the reactor; the screen was insulated from the reactor components but electrically connected to an external detector of electrical current. In operation electrical charging of the screen was detected and it is likely that this results from partial collection and discharging of the charged droplets.

The presence of the charge on the droplets of the aerosol likely enhances the ease with which the fuel dispersion is combusted, especially when the droplets are negatively charged, since the negatively charged droplets would have an increased affinity, for oxygen adduction.

It is also possible, but not confirmed that this excited state or charged droplets of the hydrocarbon molecules or ions may become bound to the gaseous carrier fluid, especially when the carrier fluid is an oxygeneous fluid, such as by forming an adduct between the oxygeneous fluid and the charged droplets.

In order to expose the atmosphere to the ultraviolet or microwave radiation or to laser beam, the chamber housing the gaseous hydrocarbon fuel may include a window transparent to the radiation or laser beam whereby the radiation or beam may be directed to the atmosphere of the gaseous hydrocarbon fuel.

ii) Specific Process

In a particular process within the aforementioned General Process, a gaseous, oxygeneous fluid is introduced into an atmosphere of gaseous hydrocarbon fuel maintained under vacuum.

The gaseous, oxygeneous fluid is suitably oxygen and/or air, or a mixture of oxygen and/or air and steam or gaseous water vapor.

The hydrocarbon fuel is suitably gasoline by which is to be understood the various grades of gasoline motor fuel; hydrocarbon fuel may also be diesel oil, natural gas or propane.

Conveniently the atmosphere of gaseous hydrocarbon fuel is formed by vaporizing a liquid hydrocarbon fuel, for example, gasoline, under vacuum or a slight pressure in a chamber. The use of a vacuum facilitates formation of the gaseous atmosphere from the liquid hydrocarbon fuel. Conveniently the vacuum corresponds to a negative pressure of 3 to 28, preferably 10 to 28 inches of mercury; when the vaporization is carried out at a slight pressure this is suitably 15 to 16 psi and the atmosphere is formed at a temperature, relative to the pressure, of up to but not to exceed the fuel flash point. Test temperature can be increased up to the flash point of hydrocarbon fuel, but not exceeding it or explosion of said fuel can occur, resulting in personal injury to the experimenter.

Suitably the vaporization is carried out at an elevated temperature, which conveniently is 250° F. to 450° F. (121° C. to 232° C.), more especially 350° F. to 410° F. (177° C. to 210° C.). The pressure extending from vacuum through partial vacuum to a slight positive pressure may be considered to be 0–16 psi.

The gaseous, oxygeneous fluid is conveniently introduced continuously into the hot atmosphere in the chamber, and the formed combustible fuel is continuously withdrawn from the chamber and delivered to the cylinders of an internal combustion engine, preferably within 5 minutes of its formation and more preferably within milliseconds of formation.

The electrical ionization potential established across the atmosphere of the hydrocarbon fuel containing the oxygeneous fluid is suitably 200–8000 volts, more usually 600–5000 volts. This is achieved by a pair of spaced apart electrodes disposed so as to be within the aforementioned atmosphere. The spacing of the electrodes is such that any current flow resulting from the potential difference applied across the electrodes is minimal, typically of the order of 0.2 to 0.8 microamps. An average of 0.5 microamps was measured in the test set-up described herein. It should be noted that electrode area and configuration will affect the current flow. Arcing must not occur between electrodes or against any part of the set-up.

In reactors employed for carrying out the invention, one electrode is disposed within the reactor and the other electrode may be defined by the wall of the reactor.

In one particular embodiment the hydrocarbon fuel is sprayed into a chamber from a spray nozzle and the oxygeneous fluid is introduced separately into the chamber, and a potential difference is established between the spray nozzle and a wall of the chamber particularly so as to produce negatively charged fuel droplets. In this embodiment, the spray nozzle functions as an electrode.

In another embodiment the potential difference is established between an electrode extending into the chamber and a wall of the chamber. The spray nozzle directs the hydrocarbon fuel generally axially of the chamber from the spray nozzle towards a fuel outlet of the chamber.

In one structure in accordance with this latter embodiment the electrode extends axially of the chamber with an inner end in spaced opposed relationship with the spray nozzle such that the gaseous hydrocarbon fuel flows axially of the chamber along and about the electrode towards the fuel outlet.

In another structure in accordance with this latter embodiment the electrode extends inwardly of a wall of the chamber and substantially normal to the axial flow of gaseous hydrocarbon fuel from the spray nozzle to the fuel outlet.

In the preferred embodiment in which air is employed as the gaseous, oxygeneous fluid, the air and the gaseous hydrocarbon fuel are suitably employed in a volume ratio of air to gaseous hydrocarbon fuel of 10 to 30:1, preferably 12 to 17:1.

The combustible fuel may be fed directly to the cylinders of an internal combustion engine, no carburetor, choke or injection system is employed. A condensate of the combustible fuel may also be formed, by subjecting the fuel to condensing conditions such as by cooling.

The combustible fuel in gaseous form does not require long term stability as it is normally formed as required and is burned continuously as it is produced, usually within a few milliseconds. The gaseous combustible fuel reverts to a liquid after about 10 minutes.

Formation of the combustible fuel can be observed as a cloud which is a whitish, silvery grey in color, while the gaseous gasoline is colourless. When delivered through a conduit the combustible fluid has been observed to retain the configuration of the bore of the conduit as it emerges from an end of the conduit and to retain this configuration as the fuel advances from the conduit, and then expand to a cloud. In one case when a vacuum was applied to draw the cloud back into the conduit, the cloud shrank to the configuration that it had, when it first emerged from the conduit and the last of it was then drawn into the conduit.

In the embodiment in which the fluid comprises air and steam and the hydrocarbon fuel is gasoline, condensation of the combustible fuel does not result in separation of water and gasoline, as would be expected in the case of a mere mixture. The combustible fuel in condensed form is homogeneous and stable. This combustible fuel is, of course, formed without emulsifiers, surfactants, catalysts or other additives. The steam derived liquid fuel condensate is relatively stable for several days and a test tube sample absorbed two more drops of water into solution readily without any evidence of separation. A third droplet of water was rejected from absorption into the solution and fell directly to the bottom of the test tube. This response being the same as adding a droplet of water directly to gasoline or oil.

In the case where the fluid is air and the gaseous hydrocarbon fuel is gasoline, the formation of the combustible fuel is visible, the cloud of combustible fuel formed about the electrodes being different from the surrounding atmosphere.

iii) Fuel

The gaseous fuel produced in accordance with the invention may be employed directly as produced or a condensate of the gaseous fuel may be produced, which liquid condensate may be employed as a substrate for conventional fuels such as gasoline.

The liquid condensate produced from the combustible fuel developed when the oxygeneous fluid is air or oxygen differs from that produced when the oxygeneous fluid comprises air or oxygen together with steam or water vapor. These two classes of condensate differ both in composition and combustion characteristics.

In accordance with the invention condensates of these two classes may be blended together to provide desired characteristics for particular applications, for example, for automobiles or jet engines or furnaces or boilers.

Furthermore, these condensates, alone or in admixture, may be blended with conventional fuels, for example, gasoline, to provide a blend of desired characteristics. For example, such a blend with conventional gasoline may produce a fuel in which the pollution generated during combustion is reduced in an amount proportionate to the content of the new condensate or condensates in the blend, as compared with that produced by the gasoline alone.

DESCRIPTION OF PREFERRED AND SPECIFIC EMBODIMENTS WITH REFERENCE TO THE DRAWINGS

Figure 1:
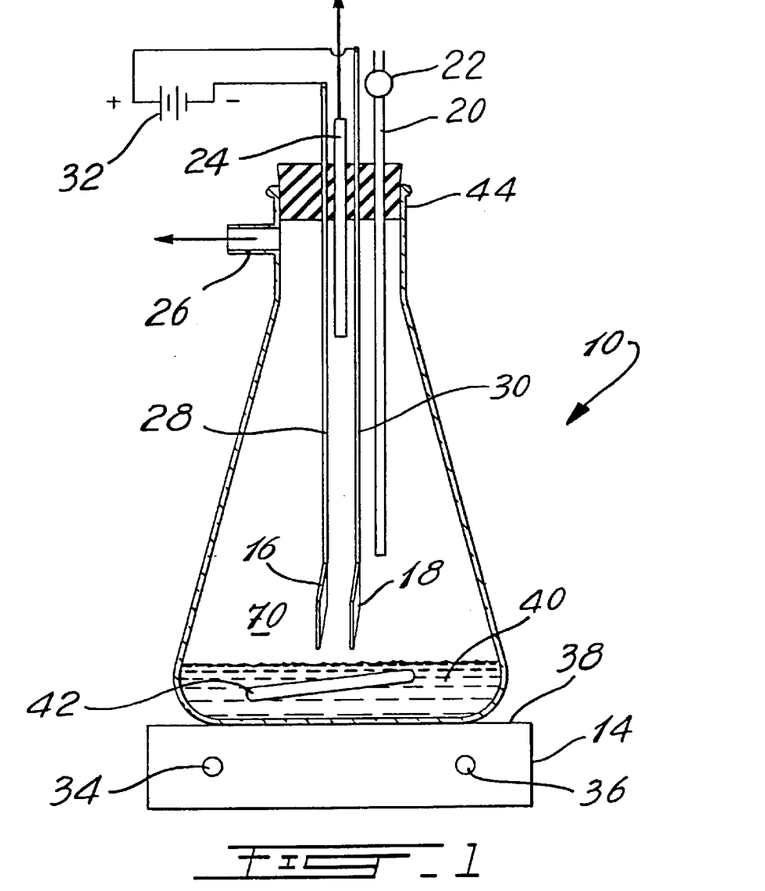
FIG. 1 illustrates schematically a laboratory assembly employed to form the combustible fuel in a first embodiment.

With further reference to FIG. 1, a laboratory assembly 10 includes a flask 12, a heat and stir unit 14 and electrodes 16 and 18.

An inlet line 20 having a valve 22 is connected to a source of oxygeneous fluid such as air.

An outlet line 24 connects the interior of flask 12 to a site requiring the combustible fuel to drive a motor.

Flask 12 has a port 26 which in use is connected to a vacuum pump (not shown) or to a motor intake manifold port effective to establish a vacuum within flask 12.

Electrodes 16 and 18 are in spaced apart relationship and are connected by electrical conductors 28 and 30, respectively to an electrical power source 32 effective to provide a potential difference between electrodes 16 and 18.

Heat and stir unit 14 includes temperature and stir controls 34 and 36 respectively. Unit 14 houses a heating unit (not shown) which in response to temperature control 34 heats a top surface 38 thereby heating a liquid hydrocarbon fuel 40 such as gasoline, housed in flask 12.

Stir control 36 activates a stirrer 42 located within the fuel 40 in flask 12. Movement of stirrer 42 to agitate fuel 40 may, for example, be by magnet control.

Flask 12 is closed by closure 44.

Figure 2:
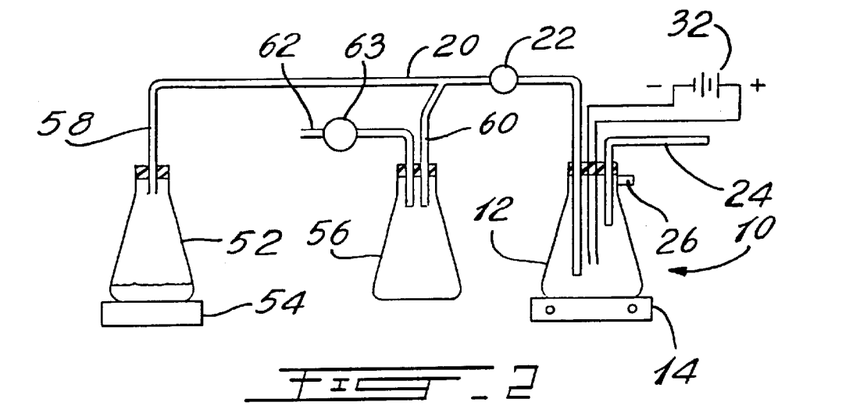
FIG. 2 illustrates schematically a laboratory assembly employed to form the combustible fuel in a second embodiment.

With further reference to FIG. 2 there is shown a modification of FIG. 1 in which assembly 10 is supplemented by a flask 52 supported by a heating unit 54; and a flask 56.

A steam line 58 from flask 52 and an air line 60 from flask 56 communicate with line 20 of FIG. 1.

Flask 56 has an air inlet line 62.

With further reference to FIG. 1, the production of the combustible fuel proceeds as follows.

Flask 12 is placed under vacuum and the liquid gasoline 40 in flask 12 is heated and agitated by unit 14 to develop a gasoline atmosphere 70 around electrodes 16 and 18. An oxygeneous fluid, for example, air is introduced into the atmosphere 70 through line 20 and a potential difference is established between electrodes 16 and 18 by electrical power source 32. A change in the appearance of atmosphere 70 is visible to the naked eye.

As atmosphere 70 is continuously developed and oxygeneous fluid air is continuously introduced, the combustible fuel developed from atmosphere 70 and the oxygeneous fluid is continuously withdrawn from flask 12 through line 24 and is dispatched directly to provide power to a motor.

In the embodiment illustrated in FIG. 2, the oxygeneous fluid fed through line 22 is a mix of air and steam. Steam is developed from water in flask 52 by the heating unit 54 and passes from flask 52 through line 58. Air is drawn into flask 56 through line 62, having metering valve 63 therein and then passes from flask 56 through line 60 which meets line 58 at line 20. Flask 56 also serves as a trap for condensed water from the steam in line 58, which condensed water flows through line 60 in opposition to the flow of air. The mixture of steam and air is delivered through line 20 into flask 56 where the combustible fuel is developed around the electrodes 16 and 18 in the same manner as described for the embodiment of FIG. 1.

Figure 7:
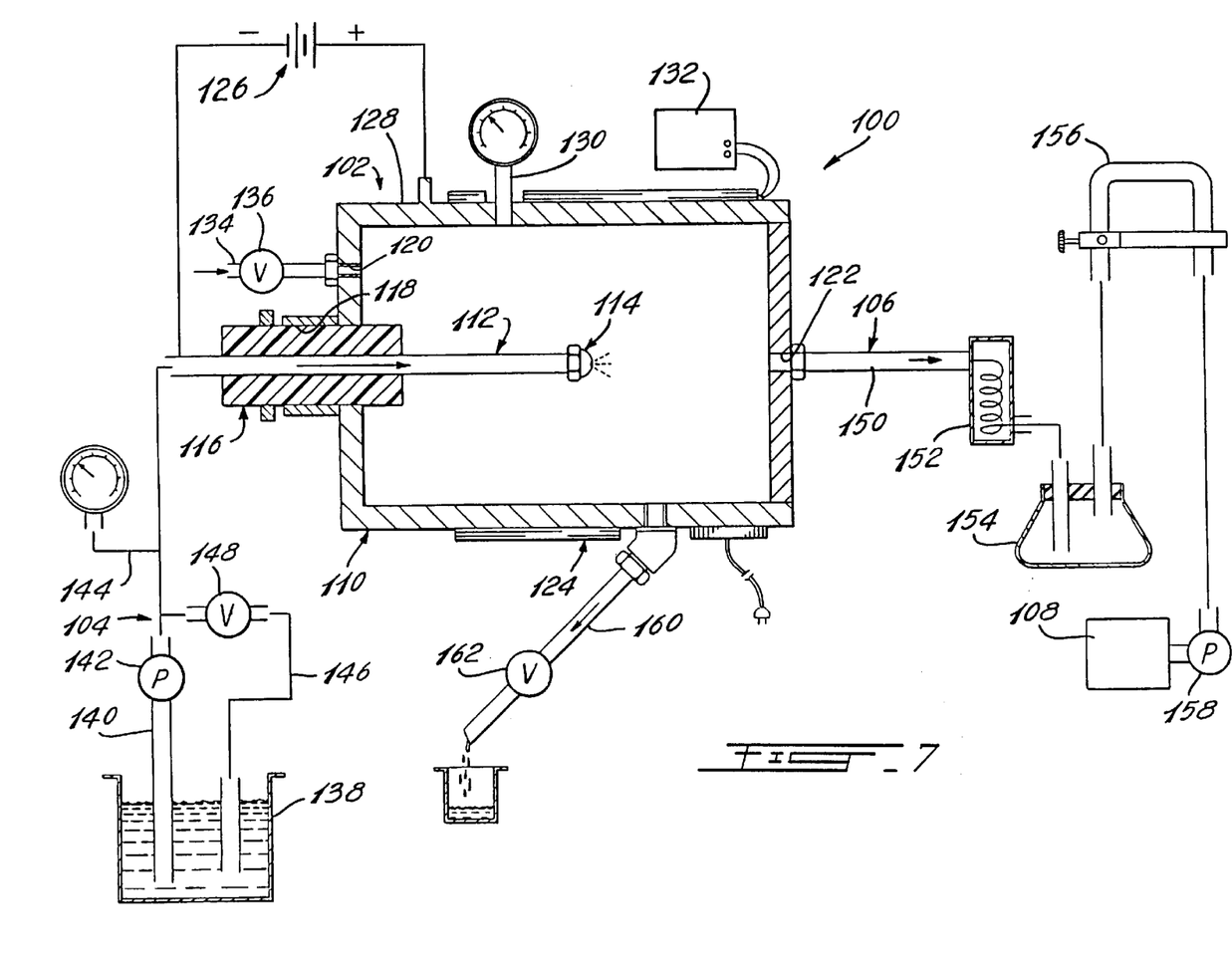
FIG. 7 is a schematic representation of a reactor assembly incorporating a reactor for carrying out the process of the invention.

With reference to FIG. 7 a reactor assembly 100 comprises a reactor 102, a fuel supply 104 and a fuel line 106 to a motor shown generally at 108.

Reactor 102 comprises a housing 110, a fuel delivery pipe 112 which terminates in a spray nozzle 114 is mounted in an electrically insulating sleeve 116 in a port 118 in housing 110. Housing 102 has an air inlet port 120 and a fuel outlet port 122.

A heating element 124 surrounds housing 110 and a voltage source 126 is connected between a wall 128 of housing 110 and pipe 112 such that pipe 112 and wall 128 form spaced apart electrodes across which a continuous ionizing direct current potential difference is established.

A vacuum gauge 130 monitors the vacuum in housing 110 and a thermocouple meter 132 monitors the temperature of reactor 102 established by heating element 124.

Feed line 134 feeds air or oxygen to housing 110, the flow being controlled by a metering valve 136.

Fuel supply 104 includes a fuel tank 138 and a fuel line 140 communicating with fuel delivery pipe 112. Fuel pump 142 and pressure gauge 144 are disposed in fuel line 140. A fuel by-pass line 146 having a metering valve 148 returns fuel in line 140 to tank 138.

Fuel line 106 includes an outflow line 150 from fuel outlet port 122, a cooling tower 152, a condensate collector 154, a vacuum control and manifold 156 and a vacuum pump 158.

Reactor 102 further includes a drain line 160 having a valve shut off 162.

Figure 8:
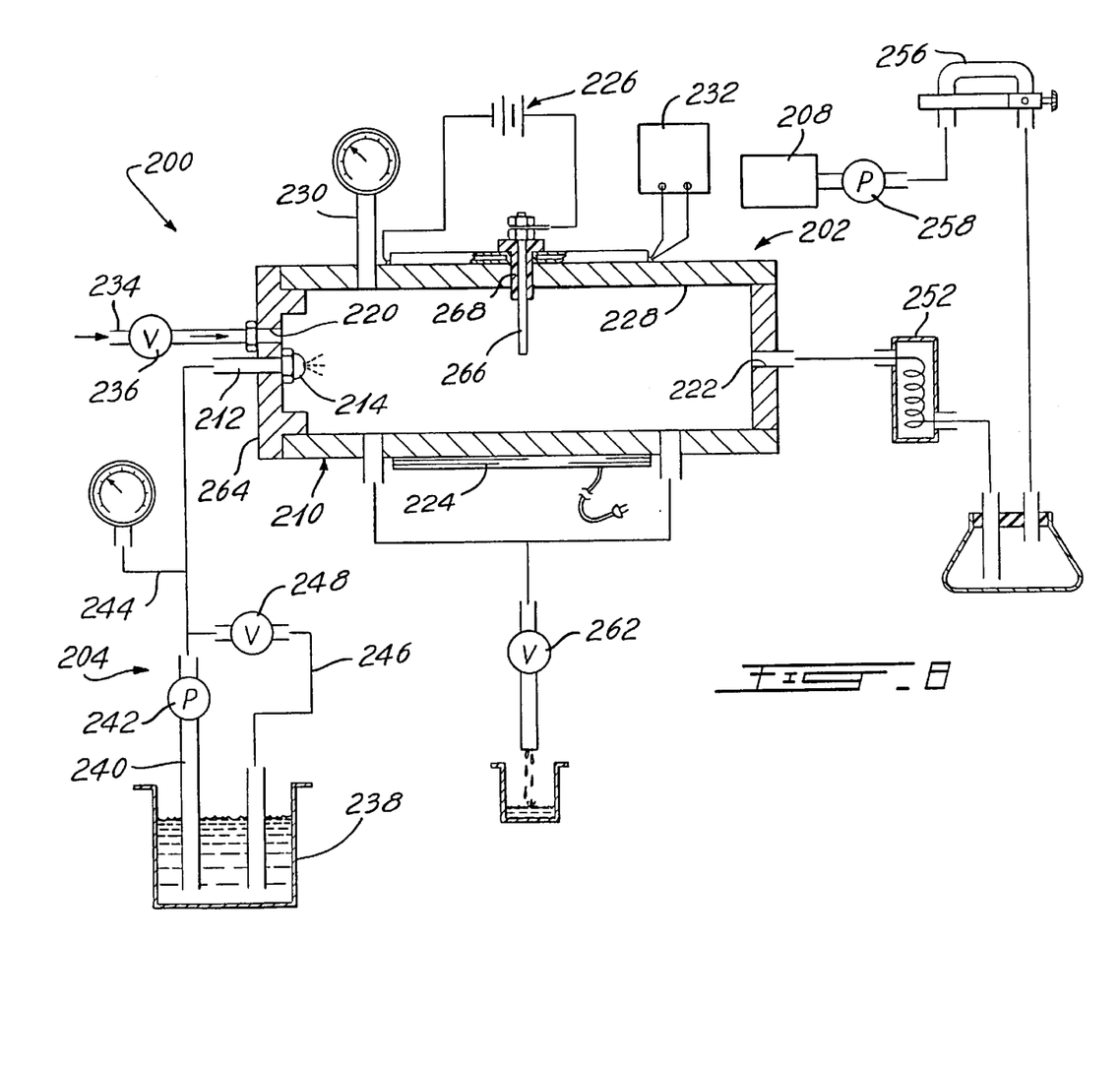
FIG. 8 shows another reactor for carrying out the process of the invention, the reactor may be employed in place of the reactor shown in FIG. 7, in the assembly of FIG. 7.

With further reference to FIG. 8 there is shown an assembly 200 having a reactor 202.

Reactor 202 has a housing 210 and a spray nozzle 214 at the end of a delivery pipe 212 in an end wall 264 of housing 210. An electrode 266 is mounted in an electrically insulating sleeve 268 extending through wall 228. Other components of assembly 200 which correspond to those of assembly 100 in FIG. 7 have the same identifying integers increased by 100. In this case, a continuous ionizing direct current potential difference is established by voltage source 226 between electrode 266 and wall 228.

Figure 9:
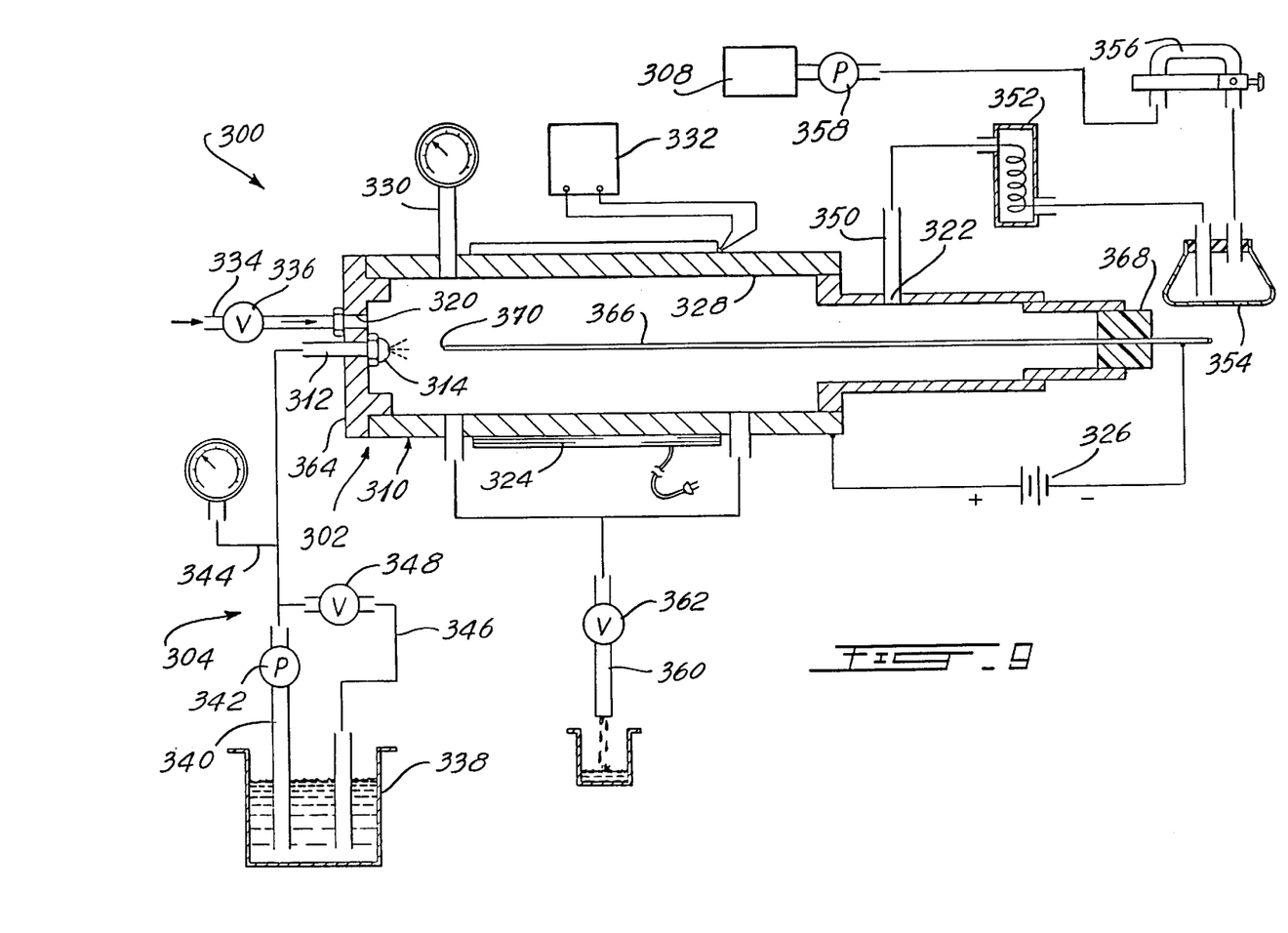
FIG. 9 shows still another reactor for carrying out the process of the invention, the reactor may be employed in place of the reactor shown in FIG. 7, in the assembly of FIG. 7.

With further reference to FIG. 9 there is shown an assembly 300 having a reactor 302.

Reactor 302 has a housing 310 and a spray nozzle 314 at the end of a delivery pipe 312 in an end wall 364 of housing 310. An elongate metal rod 366 extends within housing 310 being mounted in an electrically insulating sleeve 368 in wall 328 of housing 310. An inner end 370 of rod 366 is in spaced apart relationship with spray nozzle 314 so that fuel sprayed into housing 310 from spray nozzle 314 flows about rod 366.

Voltage source 326 is connected between rod 366 and housing wall 328. In this case a continuous ionizing direct current potential difference is established by voltage source 326 between rod 366 and wall 328. Other components of assembly 300 which correspond to those of assembly 100 in FIG. 7 have the same identifying integers increased by 200.

In operation of reactor assembly 100 with reactor 102, 202 or 302, fuel is pumped from fuel tank 138 and fuel line 140 to fuel delivery pipe 112, 212 or 312 and the fuel is delivered as a spray from spray nozzle 114, 214 or 314 into the interior of housing 110, 210 or 310.

A d.c. high voltage potential difference typically about 3,000 volts is established by voltage source 126, 226 or 326, and heating element 124, 224 or 324 establishes an elevated temperature typically about 400° F. (204° C.) within housing 110, 210 or 310.

Air is introduced into housing 110, 210 or 310 from line 134.

The high voltage potential difference and elevated temperature produce a fine dispersion of charged fuel droplets in housing 110, 210 or 310 which charged fuel droplets together with the air introduced by line 134 is drawn from housing 110, 210 or 310 by vacuum pump 158 to motor 108, via fuel outlet port 122, 222 or 322, cooling tower 152, condensate collector 154 and vacuum control and manifold 156.

EXAMPLES

Example 1

A combustible fuel was developed employing the assembly 10 of FIG. 1 using air as the oxygeneous fluid and gasoline (92 octane) as the hydrocarbon fuel at an air to gaseous gasoline volume ratio of 33:1, under a vacuum of 18 inches of mercury. The potential difference between the electrodes 16 and 18 was 700 volts d.c.

The gasoline vapor atmosphere was developed at a temperature of 250° F.

The resulting combustible fuel was dispatched directly to the motor cylinders to fuel a gasoline-powered truck motor having a V-8 engine, and was combusted within 10 milliseconds of being developed. The motor was operated at 1235 rpm.

The exhaust was analyzed.

As a comparison an identical motor was powered with the gasoline at 1193 rpm and the exhaust was analyzed. The example of the invention and the comparison example were carried out without anti-pollution systems or catalytic converter. In Table I below the results of the analysis are set out.

TABLE I

| Analysis | Invention | Comparison | Improvement |
|---|---|---|---|
| % CO | 0.15 | 2.96 | 95% |
| HC ppm | 182 | 361 | 50% |
| % CO$_2$ | 12.05 | 13.5 | 10% |
| % O$_2$ | 4.73 | 2.11 | 12% |

The results show a significant improvement in levels of emission employing the combustible fuel produced in accordance with the invention.

In further tests with a test vehicle, it was found that the motor would idle at 400 rpm and sometimes less with the combustible fuel as compared to 800 rpm with the gasoline above, so that significantly less of the combustible fuel is utilized, rendering such fuel more efficient.

Additionally employing the combustible fuel of the invention the motor started easily without choke, ran very smoothly, did not stall or back fire and operated without a catalytic converter, anti-pollution device, carburetor or fuel injection system.

Example 2

A combustible fuel was developed employing the assembly 10 of FIG. 1 using air as the oxygeneous fuel and gasoline (92 octane) as the hydrocarbon fuel at an air to gaseous volume ratio of 16:1, under a vacuum of 2 inches of mercury. The potential difference between the electrodes 16 and 18 was 800 volts.

The gasoline vapor atmosphere was developed at a temperature of 174° F.

The resulting combustible fuel was dispatched directly to fuel a 4-cylinder automobile (a 1982 Toyota). The motor of the automobile was operated at 900 rpm.

The exhaust was analyzed.

As a comparison the gasoline (92 octane) was employed to power a 1997 Dodge automobile, also operated at 900 rpm.

The exhaust was analyzed.

Table II below sets out the comparison results.

TABLE II

| Analysis | Invention | Comparison |
| --- | --- | --- |
| % CO | 0.08 | 0.126 |
| HC ppm | 2 | 173 |
| % $CO_2$ | 12.05 | 13.5 |
| % $O_2$ | 4.73 | 2.11 |

In further tests it was found that the 1982 motor employing the fuel of the invention would idle at 400 rpm whereas the comparison 1997 motor employing gasoline idled at 850 rpm.

It can be seen that the results achieved employing the fuel of the invention even in a relatively old automobile (1982) were a marked improvement over the results achieved with conventional gasoline in a new automobile (1997).

Example 3

Analytical Test

Gasoline is a complex mixture of isomeric alkanes having from 4 to 10 carbon atoms and aromatic compounds ranging from benzene, toluene and the three xylene isomers to higher alkylated benzenes. It also contains additives such as tertiary-butyl methyl ether (TBME) to increase effective octane rating and detergents meant to prevent fouling of carburetor and injector jets and to prevent oxidative formation of sludge with storage.

Analyses Performed

Analyses were carried out on gasoline and fuels of the invention produced as described hereinbefore employing air or a mixture of air and steam.

Two types of analyses were conducted. The first was an electron impact analysis of 5 samples introduced to the mass spectrometer by injection through the septum heated volume inlet.

Figure 3A:
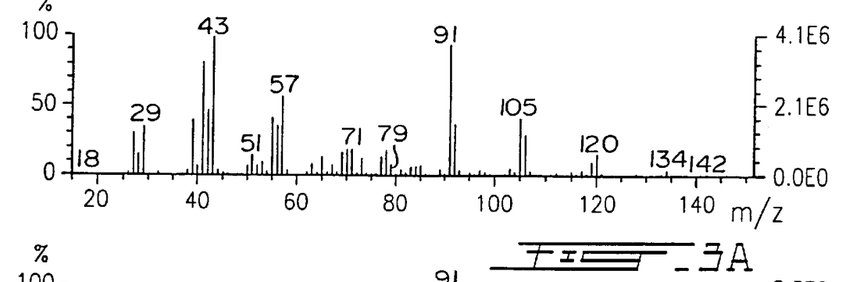
FIGS. 3A to 3E show ion characteristics of fuels of the invention as compared with the parent hydrocarbon fuel from which they are formed.
Figure 3B:
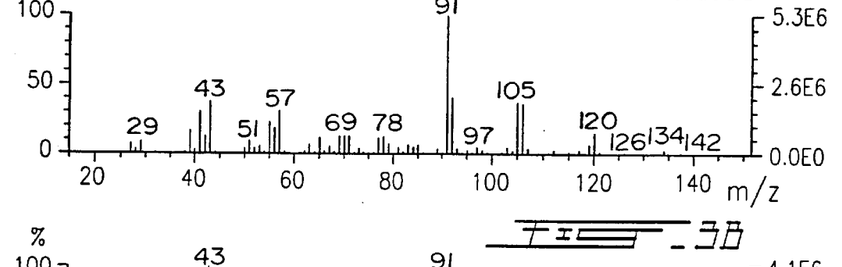
Figure 3C:
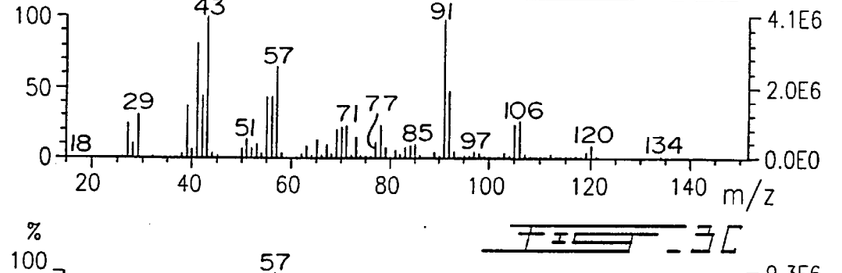

1. Starting material gasoline (E6614A FIG. 3A)
2. Vapor collected by syringe from the reactor with air (E6610A FIG. 3E)
3. Condensate collected after reaction with air (E6613A)
4. Vapor collected by syringe from the reactor with steam or air (E6611A FIG. 3D)
5. Condensate collected after reaction with steam and air (E6612A FIG. 3C)

The second group of analyses was conducted by gas chromatographic inlet to the mass spectrometer (GC-MS) of the starting material and the two condensates:

6. Starting material gasoline (Z0004 FIGS. 5A and 6A)
7. Condensate collected after reaction with air (Z0005 FIG. 5B)
8. Condensate collected after reaction with steam and air (Z0006 FIG. 6B).

Results

E6614A (FIG. 3A) shows ions characteristic of alkanes (m/z 29 ($C_2H_5$), 43 ($C_3H_7$), 57 etc.: the alkane series, each member increasing by an additional $CH_2$, 14 mass units or Daltons (Da)). There is clearly another series, one of alkene-derived ions with masses of 27, 41, 55, again increasing by 14 Da. The latter series are formed from the first by ejection of a hydrogen molecule (i.e. 29>27+$H_2$, 43>41+$H_2$, etc.). There are other ions characteristic of aromatic compounds such as benzene (78 Da), toluene (91 and 92 Da), xylene and ethylbenzene (105 and 106 Da), and trimethyl-benzene and ethyldimethylbenzene (119 and 120 Da). The relative quantities of each can be crudely estimated from the relative intensities of the ions mentioned above. An ion that does not fit any of the above series has mass 73 Da and is a fragment ion of TBME.

Z0004 (FIG. 4) is the result of the GC-MS analysis of the starting gasoline. Thirty numbered peaks are identified by comparison of their mass spectra with authentic spectra for these compounds published in the US Environmental Protection Agency/National Institutes of Health Mass Spectra Data Base. For example, peak #7 is TBME and is not well resolved from peak #8, 2-methylpentane. The spectrum for peak 8 has a moderate intensity at 73 Da due to partial co-elution of TBME with 2-methylpentane. Inspection of the mass spectra scanned from FIG. 4 reveals the ions found in E6614A, FIG. 3, the aggregate spectrum obtained for the sample as a whole. In effect, then FIG. 3 could be considered to be the algebraic sum of all the spectra scanned for the 30 peaks of FIG. 4.

Figure 4:
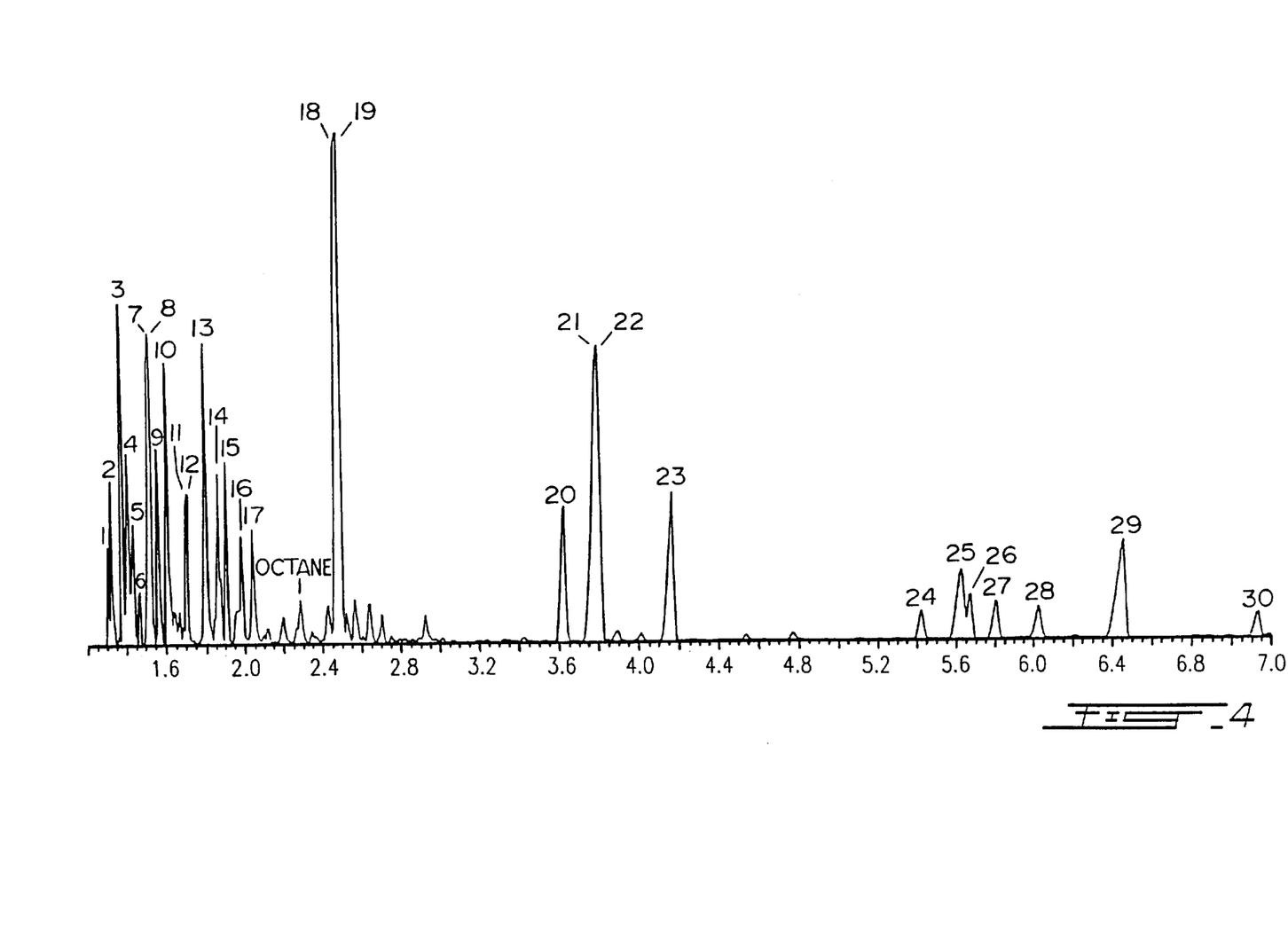
FIG. 4 is a gas chromatogram of gasoline.

The identities of peaks numbered in the gas chromatograms of the air, and steam and air condensates were confirmed to be the same as those made for gasoline and described in FIG. 4.

Comparing the GC-MS data for the condensate produced with air (FIG. 5A) with those for the gasoline (FIG. 5B) shows an overall reduction in the relative intensities of the peaks in the first half of the chromatogram which are those of the most volatile compounds. In agreement with this finding is the spectrum obtained for the same sample by septum inlet (E6613A, FIG. 3B), where the intensities of the volatile alkane and alkene series are similarly reduced relative to those in E6614A for the gasoline. One interpretation of this is that the condensate made with air has been enriched in the aromatic compounds (toluene, xylenes, etc.), perhaps at the expense of the alkanes, although by an unknown mechanism.

In a similar manner, comparing the GC-MS data for the condensate produced with steam and air (FIG. 6B) with those for the gasoline (FIG. 6A) shows perhaps the converse, an overall slight or moderate increase in the relative intensities of the peaks in the first half of the chromatogram which are those of the most volatile compounds. In support of this finding is the spectrum obtained for the same sample by septum inlet (E6612A, FIG. 3C), where the intensities of the volatile alkane and alkene series are very similar relative to those in E6614A (FIG. 3A) for the gasoline. One interpretation of this is that the condensate made with steam and air has possibly been slightly depleted in the aromatic compounds (toluene, xylenes, etc.), by their conversion to the alkanes, although by an unknown mechanism.

Figure 3D:
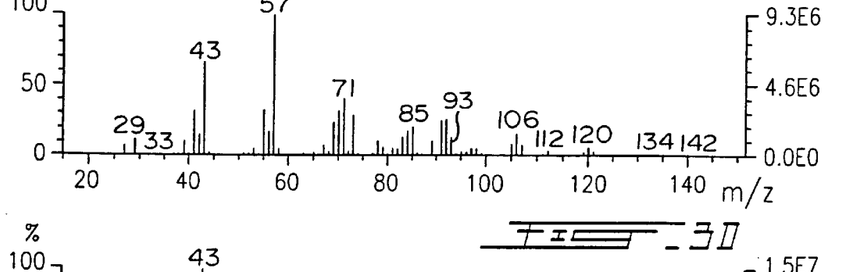
Figure 3E:
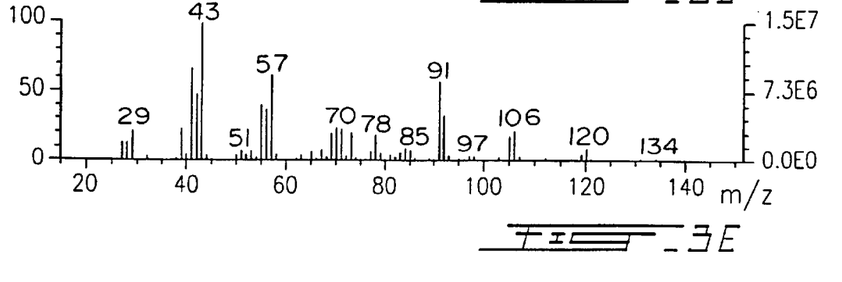

Analysis of the vapors samples from the side outlet of the glass collection volume were also done by heated volume septum inlet, and are represented by E6610A in FIG. 3E (with air) and E6611A in FIG. 3D (with stem and air). Both of these samples show intensities of ions produced by aromatic compounds reduced with respect to gasoline, with the sample with steam and air having greater reductions than with air. This last relationship accords with that noted for the condensate samples, with the possible overlying bias that the vapors will be partially depleted in the less volatile components like toluene, xylene, etc. Due to delays inherent in GC-MS analysis, vapors were not submitted to this analytical technique.

Data Evaluation and Hypothesis

No new compounds were detected by analysis of the condensates as a result of treatment in the reactor. The most noticeable differences are fairly subtle changes in the relative amounts of alkane and aromatic hydrocarbons in the condensates on GC-MS analysis and in the heated volume septum inlet spectra.

Molecular excitation occurs not only by strong electric fields and plasmas, but may also occur by illumination by intense ultraviolet (UV) radiation and by intense microwave irradiation.

FIGS. 3 to 6 are further described hereinafter:

FIGS. 3A to 3E—Mass spectra obtained for gasoline, condensate produced with air, condensate produced with steam and air, vapor produced with steam and air and vapor produced with air. The panels are arranged vertically in that order. Instrumental conditions: Vacuum Generators FAB-HS mass spectrometer, heated volume septum inlet (190° C.) ; sample volumes: 1 µL liquid, 50 µL vapor; ion source, electron impact, 240° C., 70 eV at 100 µA current; scan range, 600–15 Da at 3 sec/decade, 2000 resolving power. At least 25 scans were collected after establishment of stable signal and these were averaged to produce the spectra. The mass range 15–150 Da was reproduced to allow the data to be easily interpreted; no ion currents above 150 Da were observed.

FIG. 4—Gas chromatogram produced by analysis of gasoline used in the study. Instrumental conditions: Hewlett-Packard 5988A GC-MS, 1:100 split injection, injector temperature 250°, column 30 m×0.25 mm 250 µm DB-1 film, temperature programmed from 60 to 160° at 4°/min. Ion source 200°, 70 eV at 300 µA; scanning from 35 to 250 Da at 1 Hz. Numbered peaks have the following identifications: 1, isobutane; 2, n-butane; 4, methylbutane; 4, pentane; 5, dimethylbutene; 6, dimethylbutane; 7, TBME; 8, 2-methylpentane; 9, 3-methylpentane; 10, n-hexane; 11, methylpentene; 12, methylpentene isomer; 13, benzene; 14, dimethylpentane; 15, methylhexane, 16, dimethylhexane; 17, n-heptane; 18, toluene; 19, toluene; 20, ethylbenzene; 21, o-xylene; 22, m-xylene; 23, p-xylene; 24, propylbenzene; 25, ethylmethylbenzene, 26, ethylmethylbenzene isomer; 27, trimethylbenzene; 28, ethylmethylbenzene isomer; 29, trimethylbenzene isomer; 30, trimethylbenzene isomer. There are no components of significance eluting later than 9 minutes. All of these compounds were also detected in the condensates, but in altered relative ratios (see FIGS. 5 and 6).

Figure 5A:
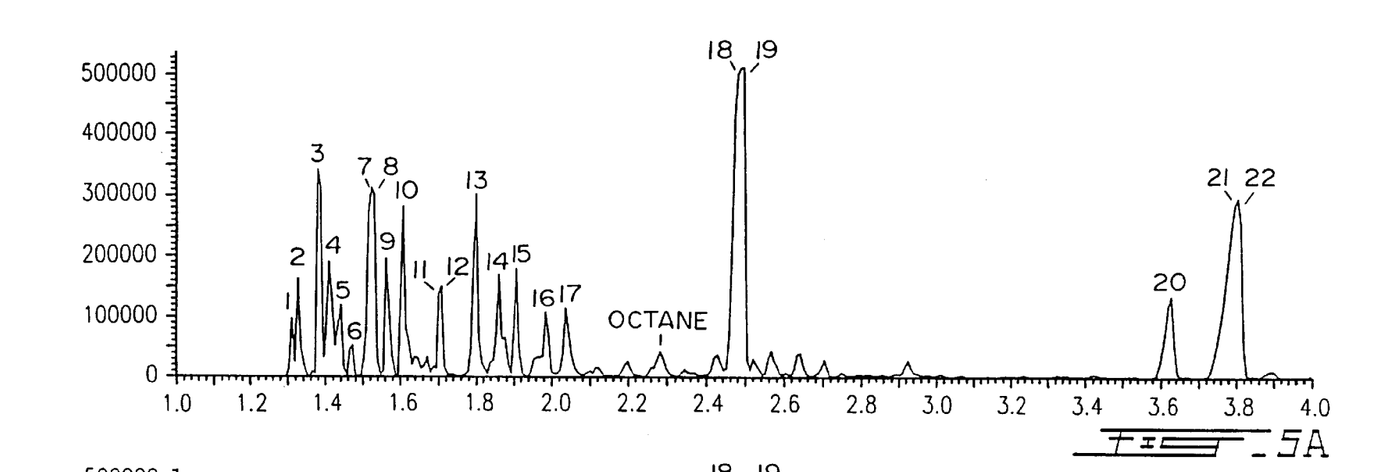
FIGS. 5A and 5B are gas chromatograms of a fuel of the invention produced with air and the gasoline of FIG. 4.
Figure 5B:
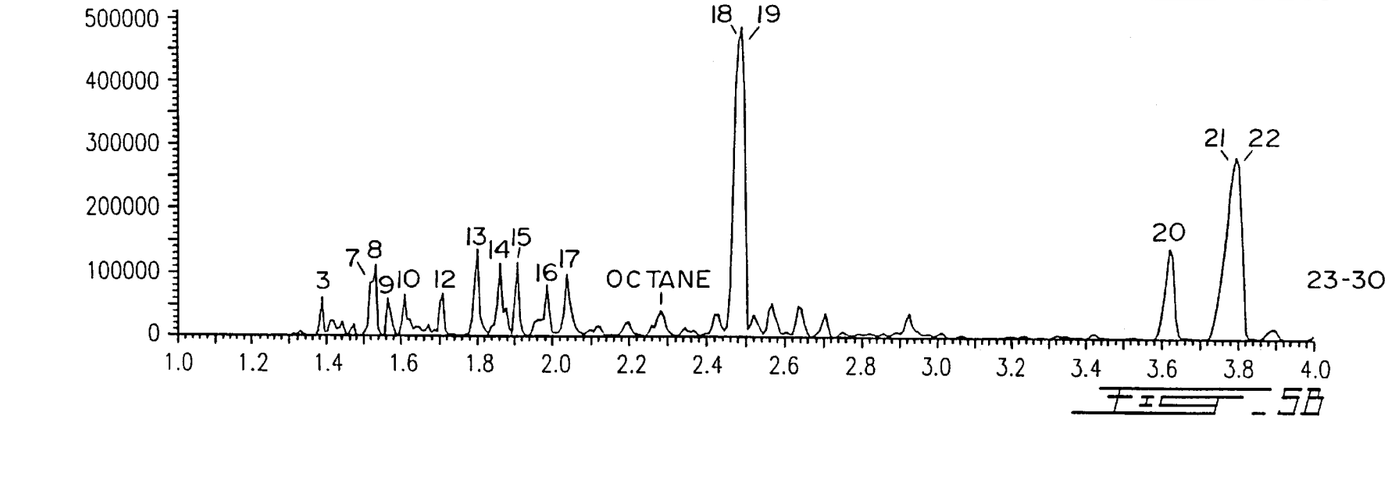

FIGS. 5A and 5B—Gas chromatograms obtained in the interval 1 to 4 minutes after sample injection for gasoline (upper panel), and for the condensate produced with air (lower panel). The chromatograms are reproduced together to facilitate comparisons. This interval was expanded to make more apparent the differences in the samples. Peaks eluting in the interval 4 to 7 minutes were unchanged with respect to those in gasoline. The numbered peaks have the same identities as those in FIG. 4. The condensate made with air is slightly depleted in the moderately volatile components up to about benzene (peak 13), with the most volatile (early eluting) depleted the most. No new compounds were detected.

Figure 6A:
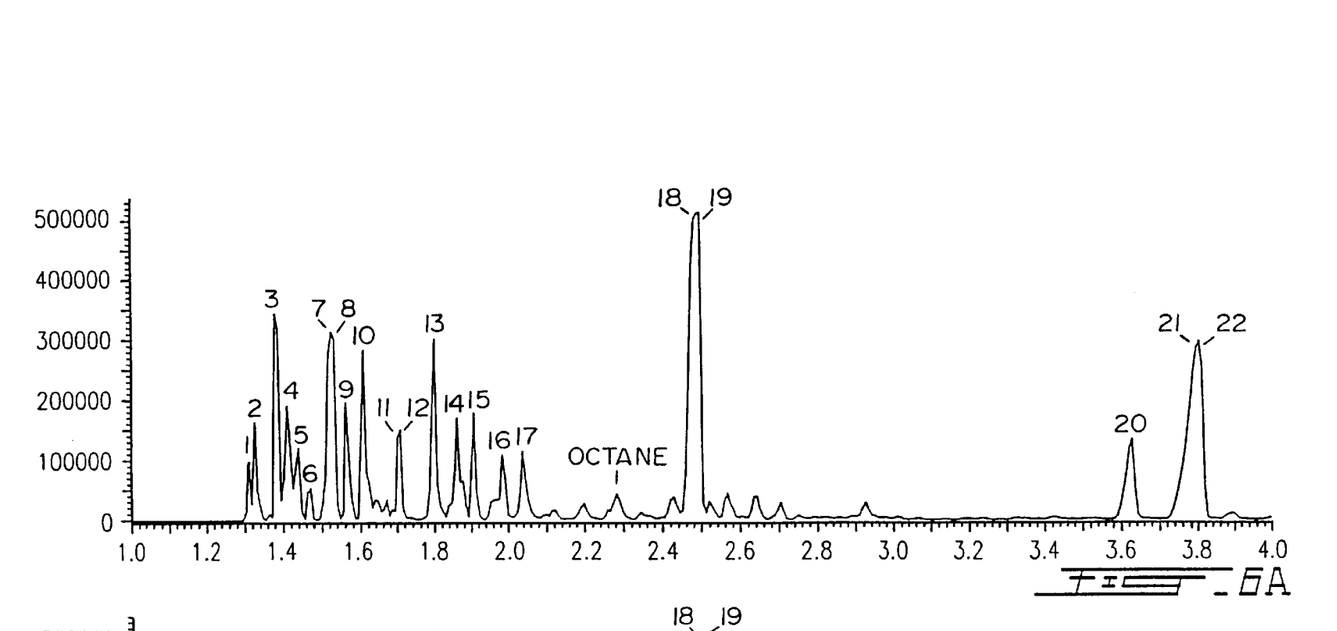
FIGS. 6A and 6B are gas chromatograms of a fuel of the invention produced with air and steam and the gasoline of FIG. 4.
Figure 6B:
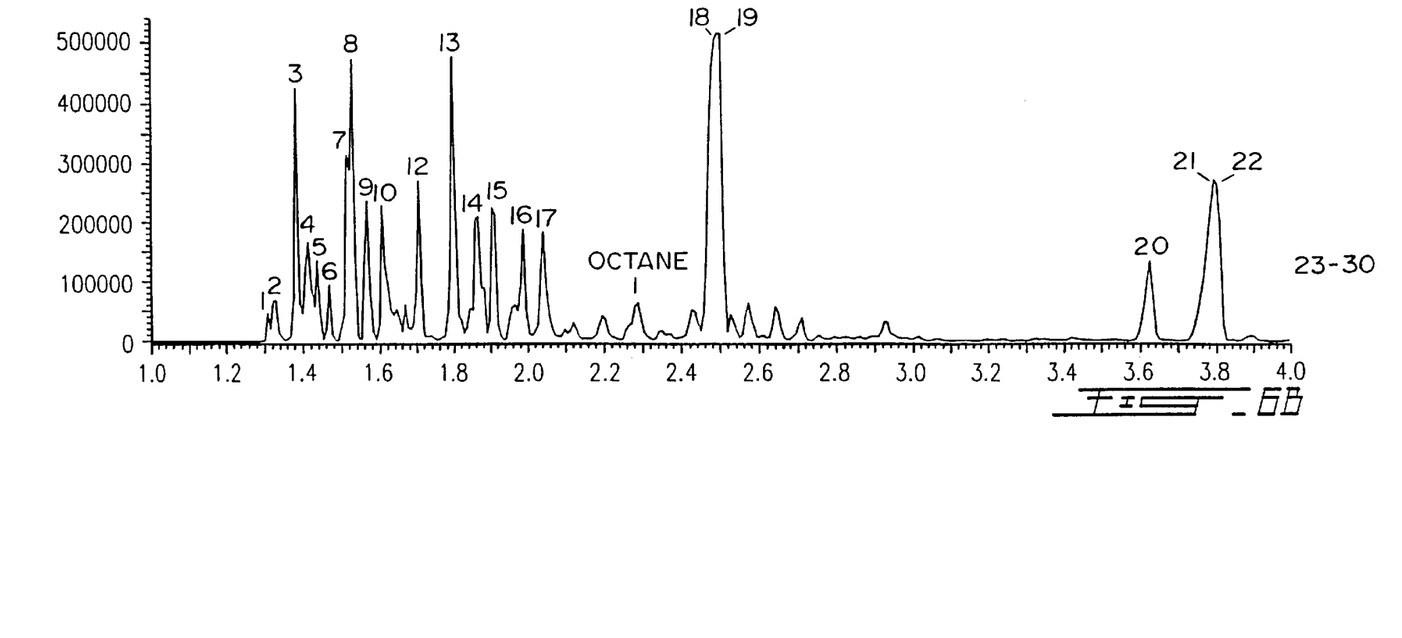

FIGS. 6A and 6B—Gas chromatograms obtained for gasoline (FIG. 6A), and for the condensate made with steam (FIG. 6B) over the interval of 1 to 4 minutes after sample injection. Peaks eluting in the interval 4 to 7 minutes were unchanged with respect to those in gasoline. The numbered peaks have the same identities as those in FIG. 4. The condensate made with stem is apparently slightly enriched in the moderately volatile components. No new compounds were detected.

EXAMPLE 4

A test was carried out employing the reactor assembly 100 with reactor 102 illustrated in FIG. 7. For the purposes of the test, reactor 102 was modified to include within housing 110, a copper screen extending between an insulating ring mounted in the walls of housing 110 downstream of spray nozzle 114 and a volt meter was connected between the copper screen and the wall 128 of housing 110. The volt meter was employed to determine repeated charge on the copper screen during operation of the reactor 102 and during non-operation of the reactor 102 when the flow of fuel from tank 138 was discontinued.

During operation of reactor 102 the charge on the copper screen as determined by the volt meter ranged from 10.15 mV to 11.4 mV in the repeated test results, while during non-operation of reactor 102 the volt meter readings ranged from −0.01 mv to −0.62 mV. In this test, the voltage source 12 applied a potential difference of −6110 volts and the housing 110 was maintained at 307° F. to 312° F. (153° C. to 155° C.)

A similar test was carried out employing the assembly 200 of FIG. 8 modified to include a similar copper screen downstream of nozzle 214 and electrode 266. The volt meter was connected between the copper screen and the wall 228 of the housing 210.

In this latter test the fuel was delivered from spray nozzle 214 at 0.7 g ph (US) at a fuel pressure of 6 psi under a vacuum in housing 210 of 3 to 4 inches Hg.

The Table below shows the voltage on the copper screen with the reactor in operation and non-operating at different temperature and with some variation in the voltage applied by voltage source 226.

TABLE

| Temperature (in 210) | Applied voltage (226) | HV µA | Charge on screen | Reactor condition |
|---|---|---|---|---|
| 270° F. | 0 V | 0.1 µA | +0.2 mV | OFF |
| 338° F. | 5000 V | 0.1 µA | −670.0 mV | ON |
| 338° F. | 5000 V | 0.1 µA | −2.0 mV | OFF |
| 340° F. | 6000 V | 0.1 µA | −870.0 mV | ON |
| 340° F. | 6000 V | 0.1 µA | −4.0 mV | OFF |
| 398° F. | 6000 V | 0.1 µA | −1,460.0 mV | ON |

In this latter case the spray nozzle 214 is positive as is wall 228 of the reactor and the electrode 266 is negative, and negative voltages are obtained on the copper screen (except where there is no applied voltage).

These tests demonstrate that the fuel particles were energized to a negative charge in operation of the reactor 102 and 202.

We claim:

1. A process of producing combustible fuel comprising exposing an atmosphere of gaseous hydrocarbon fuel, maintained under vacuum, to a direct current potential difference to produce charged particles of combustible fuel, having improved combustibility as compared with said hydrocarbon fuel, said potential difference being applied under non-arcing conditions.

2. A process for producing combustible fuel comprising exposing an atmosphere of gaseous hydrocarbon fuel maintained under a pressure of 0 to 16 psi, to a direct current potential difference to produce combustible fuel bearing negatively charged particles, said combustible fuel having improved combustibility as compared with said hydrocarbon fuel, said potential difference being applied under non-arcing conditions.

3. A process according to claim 2, wherein said potential difference is applied across said atmosphere between first and second electrodes, said electrodes being spaced apart such that the current flow between the electrodes is 0.2 to 0.8 microamps.

4. A process according to claim 3, wherein said atmosphere is contained within a reactor and one of said first and second electrodes is defined by a wall of the reactor.

5. A process according to claim 3, wherein the current flow between electrodes is 0.1 microamps.

6. A process according to claim 2, wherein said atmosphere is exposed to said potential difference at an elevated temperature not exceeding the flash point of said hydrocarbon fuel to produce said negatively charged particles.

7. A process according to claim 6, wherein said elevated temperature is 350° F. to 410° F.

8. A process according to claim 7, wherein said potential difference is 600 to 5000 volts and said exposing is at a pressure of 0–16 psi.

9. A process according to claim 3, wherein said potential difference is 200 to 8000 volts.

10. A process according to claim 6, wherein said elevated temperature is 250° F. to 450° F.

* * * * *